(12) United States Patent
Park et al.

(10) Patent No.: US 11,885,648 B2
(45) Date of Patent: Jan. 30, 2024

(54) SENSOR DEVICES AND METHODS FOR DETERMINING A ROTATION ANGLE OF A MAGNET

(71) Applicant: Infineon Technologies AG, Neubiberg (DE)

(72) Inventors: Joo II Park, Sungnam (KR); Richard Heinz, Munich (DE); Hyun Jeong Kim, Seoul (KR); Stephan Leisenheimer, Deisenhofen (DE); Severin Neuner, Valley (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 17/864,805

(22) Filed: Jul. 14, 2022

(65) Prior Publication Data

US 2023/0037205 A1 Feb. 2, 2023

(30) Foreign Application Priority Data

Jul. 20, 2021 (DE) .......................... 102021118713.3

(51) Int. Cl.
*G01D 5/14* (2006.01)
*G01D 18/00* (2006.01)

(52) U.S. Cl.
CPC ............... *G01D 5/14* (2013.01); *G01D 18/00* (2013.01)

(58) Field of Classification Search
CPC .................................. G01D 5/14; G01D 18/00
See application file for complete search history.

(56) References Cited

U.S. PATENT DOCUMENTS

| | | | |
|---|---|---|---|
| 11,231,267 B2* | 1/2022 | Antraygue | ............... G01B 7/30 |
| 2010/0321008 A1 | 12/2010 | Mita et al. | |
| 2016/0216132 A1* | 7/2016 | Ausserlechner | ......... G01D 5/14 |
| 2021/0262832 A1* | 8/2021 | Heinz | .................... G05G 9/047 |

FOREIGN PATENT DOCUMENTS

| | | |
|---|---|---|
| DE | 102013226677 A1 | 7/2014 |
| EP | 3514502 A1 | 7/2019 |
| JP | 2012237682 A | 12/2012 |

(Continued)

OTHER PUBLICATIONS

J. Fang, H. Sun, J. Cao, X. Zhang and Y. Tao, "A Novel Calibration Method of Magnetic Compass Based on Ellipsoid Fitting," in IEEE Transactions on Instrumentation and Measurement, vol. 60, No. 6, pp. 2053-2061, Jun. 2011, doi: 10.1109/TIM.2011.2115330.

(Continued)

*Primary Examiner* — Reena Aurora
(74) *Attorney, Agent, or Firm* — Harrity & Harrity, LLP

(57) ABSTRACT

A method for determining a rotation angle of a magnet includes measuring a 3D magnetic field vector of a magnetic field generated by the magnet, wherein the 3D magnetic field vector describes at least a part of an ellipse in 3D space during a rotational movement of the magnet. The method further includes mapping the measured 3D magnetic field vector to a 2D vector based on a compensation mapping, wherein the compensation mapping is configured to map the ellipse in 3D space to a circle in 2D space. The method further includes determining the rotation angle of the magnet based on the 2D vector.

25 Claims, 9 Drawing Sheets

(56) References Cited

FOREIGN PATENT DOCUMENTS

| JP | 2016061708 A | 4/2016 |
|---|---|---|
| JP | 6019585 B2 | 11/2016 |
| JP | 2019095256 A | 6/2019 |
| WO | 8800330 A1 | 1/1988 |

OTHER PUBLICATIONS

K. Papafotis and P. P. Sotiriadis, "MAG.I.C.AL. A Unified Methodology for Magnetic and Inertial Sensors Calibration and Alignment," in IEEE Sensors Journal, vol. 19, No. 18, pp. 8241-8251, Sep. 2019, doi: 10.1109/JSEN.2019.2919179.

Q. Zhang, Q. Gao, Y. Chen and X. Huang, "A novel magnetic compass calibration method based on improved ellipse model," 2010 International Conference on Intelligent Control and Information Processing, 2010, pp. 11-15, doi: 10.1109/ICICIP.2010.5564263.

* cited by examiner

SENSOR DEVICES AND METHODS FOR DETERMINING A ROTATION ANGLE OF A MAGNET

RELATED APPLICATION

This application claims priority to German Patent Application No. 102021118713.3, filed on Jul. 20, 2021, which is incorporated herein by reference in its entirety.

FIELD

The present disclosure relates to sensor devices and methods for determining a rotation angle of a magnet.

BACKGROUND

Sensor devices may be used for sensing a rotation of a magnet or a component mechanically coupled thereto. For this purpose, the sensor devices may need to be arranged in plane with the magnet or in line with the rotation axis of the magnet. Such approaches may result in stringent placement limitations of the magnet and the sensor devices. Manufacturers and developers of sensor devices and associated sensing methods are constantly striving to improve their products. In particular, it may be desirable to provide concepts which are not limited by the above-mentioned specific placement limitations.

SUMMARY

An aspect of the present disclosure relates to a method for determining a rotation angle of a magnet. The method includes measuring a 3D magnetic field vector of a magnetic field generated by the magnet, wherein the 3D magnetic field vector describes at least a part of an ellipse in 3D space during a rotational movement of the magnet. The method further includes mapping the measured 3D magnetic field vector to a 2D vector based on a compensation mapping, wherein the compensation mapping is configured to map the ellipse in 3D space to a circle in 2D space. The method further includes determining the rotation angle of the magnet based on the 2D vector.

An aspect of the present disclosure relates to a sensor device. The sensor device includes a magnetic field sensor configured to measure a 3D magnetic field vector of a magnetic field generated by a magnet, wherein the 3D magnetic field vector describes at least a part of an ellipse in 3D space during a rotational movement of the magnet. The sensor device further includes a calculation unit. The calculation unit is configured to map the determined 3D magnetic field vector to a 2D vector based on a compensation mapping, wherein the compensation mapping is configured to map the ellipse in 3D space to a circle in 2D space. The calculation unit is further configured to determine the rotation angle of the magnet based on the 2D vector.

DETAILED DESCRIPTION

The methods and sensor devices described herein may be configured to determine a rotation angle of a magnet. The described concepts may be used for all kinds of angular measurements. When determining the rotation angle, the magnet may perform a rotational movement or may be in a static state. The concepts described herein may also be configured to determine a rotation angle of a component mechanically coupled to the magnet, wherein a rotation of the component may be based on a rotation of the magnet. The component may be of arbitrary type. In one example, the component may include or may correspond to an automotive component. An automotive component may, for example, be a steering wheel of a vehicle, in particular a steering wheel of an electric power steering system. In a further example, the concepts described herein may determine rotation angles of a valve or a component of a valve control system. In a further example, the component may include or may correspond to a windshield wiper or another component of a windshield wiper application. In still another example, rotation angles of a component of a clutch may be determined. In yet further examples, the component may include or may correspond to a rotary knob, a component of an (in particular electric or combustion) engine, a shaft, a wind meter, etc.

Figure 1:
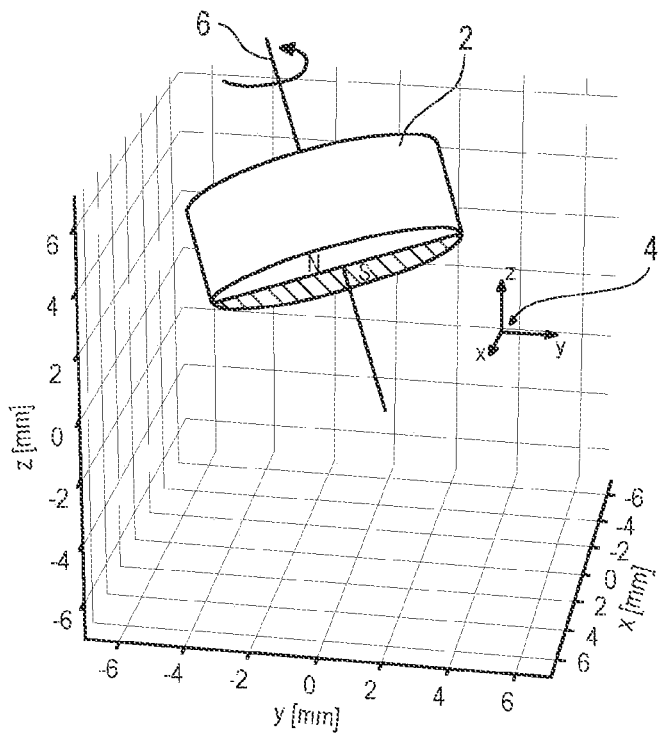
FIG. 1 illustrates a perspective view of an arrangement including a magnet and a sensor device arbitrarily arranged in 3D space.

FIG. 1 shows a coordinate system with coordinate axes in the x-, y- and z-direction in units of mm. A magnet 2 and a sensor device 4 may be arbitrarily arranged in 3D space, wherein the magnet 2 may be configured to rotate around a rotation axis 6. The magnet 2 may be a diametric magnet, i.e. it may be diametrically magnetized. In the example of FIG. 1, the magnet 2 may have the shape of a disc with a first half of the disc forming a north pole of the magnet 2 and the second half of the disc forming a south pole of the magnet 2. The magnet 2 and its rotation axis 6 may be tilted with respect to the coordinate axes of the coordinate system. For the sake of simplicity, the sensor device 4 is simply indicated by a small coordinate system indicating an arrangement of the sensor device 4 in 3D space. The small coordinate system of the sensor device 4 may differ from the coordinate system of the entire arrangement or may not.

The sensor device 4 may include a magnetic field sensor (not illustrated) configured to measure a 3D magnetic field vector of a magnetic field generated by a magnet 2. The magnetic field sensor may correspond to an integrated circuit, such that it may also be referred to as a magnetic field sensor IC. In one example, the magnetic field sensor may be a 3D Hall sensor or 3D Hall IC. In this case, sensor elements of the magnetic field sensor may be Hall elements or Hall sensor elements which may be integrated into the integrated circuit. In further examples, the magnetic field sensor may be an xMR sensor, in particular an AMR sensor, a GMR sensor or a TMR sensor.

Figure 2:
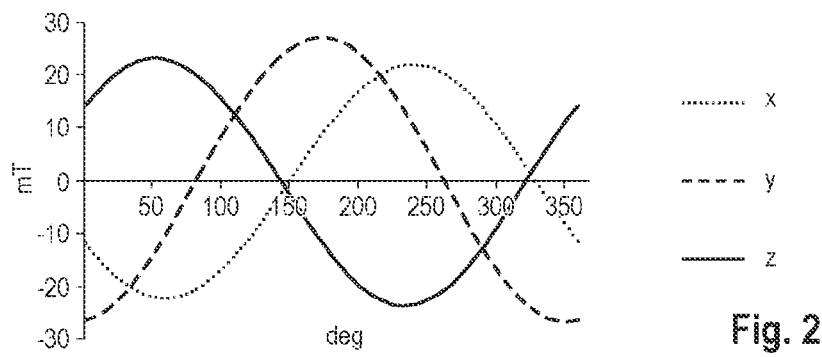
FIG. 2 illustrates magnetic field components generated by a rotating magnet.

FIG. 2 illustrates components of a magnetic field generated by the magnet 2 rotating around the rotation axis 6. The magnetic field components in the x-, y- and z-direction in units of mT are plotted against the rotation angle of the magnet 2 in units of degrees. The x-component of the magnetic field is illustrated by a dotted line, the y-component of the magnetic field is illustrated by a dashed line, and the z-component of the magnetic field is illustrated by a solid line. Each of the magnetic field components may have a sinusoidal waveform. The magnetic field components may differ in amplitude and phase.

Figure 3:
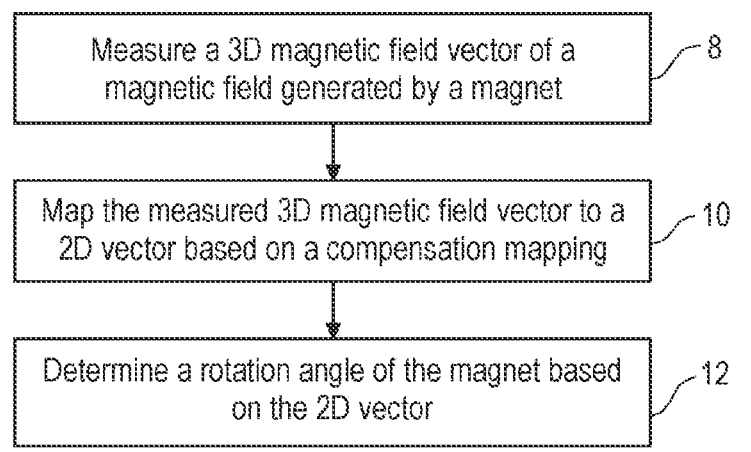
FIG. 3 illustrates a flowchart of a method for determining a rotation angle of a magnet in accordance with the disclosure.

FIG. 3 illustrates a flowchart of a method for determining a rotation angle of a magnet in accordance with the disclosure. The method is described in a general manner in order to qualitatively specify aspects of the disclosure. It is understood that the method may include further aspects. For example, the method may be extended by any of the aspects described in connection with other examples in accordance with the disclosure.

At 8, a 3D magnetic field vector of a magnetic field generated by a magnet may be measured, wherein the 3D magnetic field vector may describe at least a part of an ellipse in 3D space during a rotational movement of the magnet. At 10, the measured 3D magnetic field vector may be mapped to a 2D vector based on a compensation mapping, wherein the compensation mapping may be configured to map the ellipse in 3D space to a circle in 2D space. At 12, a rotation angle of the magnet may be determined based on the 2D vector.

In the following, a mathematical concept for performing the method of FIG. 3 is described in more detail. Referring back to FIG. 1, the sensor device 4 may measure a 3D magnetic field vector $$\begin{pmatrix} B_x \\ B_y \\ B_z \end{pmatrix}$$

including three magnetic field components $B_x$, $B_y$ and $B_z$ of the magnetic field generated by the magnet 2. The measured 3D magnetic field vector may be mapped to a 2D vector $$\begin{pmatrix} COS \\ SIN \end{pmatrix}$$

based on a compensation mapping according to:

$$\begin{pmatrix} COS \\ SIN \end{pmatrix} = \begin{pmatrix} b_{00} & b_{01} & b_{02} \\ b_{10} & b_{11} & b_{12} \end{pmatrix} \cdot \begin{pmatrix} B_x \\ B_y \\ B_z \end{pmatrix}. \quad (1)$$

The compensation mapping may be a linear mapping represented by a compensation matrix $$\begin{pmatrix} b_{00} & b_{01} & b_{02} \\ b_{10} & b_{11} & b_{12} \end{pmatrix}.$$

The rotation angle $\varphi$ of the magnet 2 may be determined based on the 2D vector. In particular, the rotation angle $\varphi$ may be determined by calculating an arctangent function of the two vector components COS and SIN of the 2D vector according to:

$$\varphi = \arctan 2(COS, SIN) - \varphi_0. \quad (2)$$

The angle $\varphi_0$ may correspond to a zero angle which may be determined in a calibration process described in more detail below.

The compensation matrix of equation (1) may be determined by performing a calibration process. In the following, a mathematical concept for performing the calibration process is described in more detail. The previously described acts of mapping the 3D magnetic field vector to the 2D vector according to equation (1) and determining the rotation angle based on the 2D vector according to equation (2) may be performed in real-time by using the compensation matrix determined in the calibration process.

In a first act of the calibration process, the magnet 2 of FIG. 1 may be rotated to three arbitrary and different angle positions with respect to the sensor device 4. For each of the three angles, the sensor device 4 may measure the three magnetic field components of the magnetic field generated by the magnet 2 at the position of the sensor device 4. The measurements may result in three measured 3D magnetic field vectors $\vec{p}_0$, $\vec{p}_1$ and $\vec{p}_2$. The magnetic field vector $\vec{p}_0$ and its associated angle $\varphi_0$ may define the zero angle of equation (2). As will become apparent below, the compensation matrix of equation (1) may be determined based on the three 3D magnetic field vectors.

When measuring the 3D magnetic field vectors $\vec{p}_0$, $\vec{p}_1$ and $\vec{p}_2$, a distance between adjacent ones of the vectors may be chosen as larger as possible. In particular, the three angle positions of adjacent ones of the three 3D magnetic field vectors may differ by at least 90 degrees, more particular by at least 100 degrees, and even more particular by at least 110 degrees. In one specific example, the three angle positions of adjacent ones of the three 3D magnetic field vectors may differ by a value of 120 degrees.

In a further act of the calibration process, a set of orthogonal basis vectors $\vec{n}_0$ $\vec{n}_1$ and $\vec{n}_2$ may be calculated based on the magnetic field vectors $\vec{p}_0$, $\vec{p}_1$ and $\vec{p}_2$ according to:

$$\vec{n}_0 = \vec{p}_0 - \vec{p}_1, \quad (3a)$$

$$\vec{n}_1 = \vec{n}_2 \times \vec{n}_0, \quad (3b)$$

$$\vec{n}_2 = \vec{n}_0 \times (\vec{p}_2 - \vec{p}_1). \quad (3c)$$

The orthogonal basis vectors $\vec{n}_0$, $\vec{n}_1$ and $\vec{n}_2$ may be normalized to obtain a set of orthonormal basis vectors $\vec{m}_0$, $\vec{m}_1$ and $\vec{m}_2$ according to:

$$\vec{m}_0 = \frac{\vec{n}_0}{\|\vec{n}_0\|} = \begin{pmatrix} m_{00} \\ m_{01} \\ m_{02} \end{pmatrix}, \tag{4a}$$

$$\vec{m}_1 = \frac{\vec{n}_1}{\|\vec{n}_1\|} = \begin{pmatrix} m_{10} \\ m_{11} \\ m_{12} \end{pmatrix}, \tag{4b}$$

$$\vec{m}_2 = \frac{\vec{n}_2}{\|\vec{n}_2\|} = \begin{pmatrix} m_{20} \\ m_{21} \\ m_{22} \end{pmatrix}. \tag{4c}$$

A transformation mapping may be formed based on the orthonormal vectors $\vec{m}_0$ and $\vec{m}_1$. The transformation mapping may be a linear mapping represented by a transformation matrix according to:

$$M = \begin{pmatrix} m_{00} & m_{01} & m_{02} \\ m_{10} & m_{11} & m_{12} \end{pmatrix}. \tag{5}$$

When forming the transformation matrix M of equation (5), the orthonormal vector $\vec{m}_2$ may be skipped. The transformation matrix M may be used for mapping a three-dimensional vector to a two-dimensional vector.

In a further act of the calibration process, the three 3D magnetic field vectors $\vec{p}_0$, $\vec{p}_1$ and $\vec{p}_2$ may be transformed to three two-dimensional vectors $\vec{p}'_0$, $\vec{p}'_1$ and $\vec{p}'_2$ based on the transformation matrix M according to:

$$\vec{p}'_0 = \begin{pmatrix} m_{00} & m_{01} & m_{02} \\ m_{10} & m_{11} & m_{12} \end{pmatrix} \cdot \vec{p}_0, \tag{6a}$$

$$\vec{p}'_1 = \begin{pmatrix} m_{00} & m_{01} & m_{02} \\ m_{10} & m_{11} & m_{12} \end{pmatrix} \cdot \vec{p}_1, \tag{6b}$$

$$\vec{p}'_2 = \begin{pmatrix} m_{00} & m_{01} & m_{02} \\ m_{10} & m_{11} & m_{12} \end{pmatrix} \cdot \vec{p}_2. \tag{6c}$$

For each of the three two-dimensional vectors $\vec{p}'_0$, $\vec{p}'_1$ and $\vec{p}'_2$ the respective two vectors components may be inserted into a centered ellipse equation according to:

$$AX^2 + BXY + CY^2 = 1 \tag{7}$$

such that an equation system including three equations may be obtained. The three coefficients A, B and C of equation (7) may be determined by solving the equation system in an arbitrary manner, for example based on a Gauss algorithm.

The determined coefficients A, B and C may be used to form a symmetric matrix $$\begin{pmatrix} A & C/2 \\ C/2 & B \end{pmatrix}$$

representing the ellipse equation (7). That is, equation (7) may be alternatively written according to:

$$(x, y) \cdot \begin{pmatrix} A & C/2 \\ C/2 & B \end{pmatrix} \cdot \begin{pmatrix} x \\ y \end{pmatrix} = 1. \tag{8}$$

Figure 14:
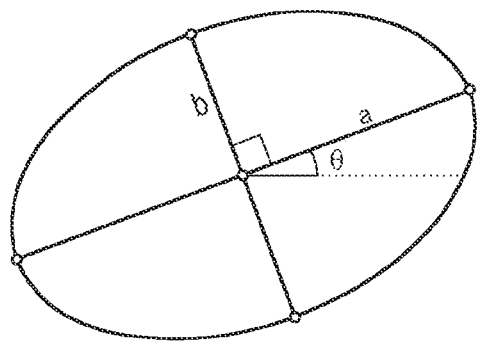
FIG. 14 illustrates an ellipse arranged in 2D space.

In a further act of the calibration process, characteristic values of the ellipse specified by the symmetric matrix of equation (8) may be determined. Characteristic values of an ellipse arranged in a two-dimensional coordinate system may be the lengths a and b of the two half axes of the ellipse as well as the rotation angle θ of the ellipse with respect to one of the coordinate axes. The characteristic values of an ellipse are exemplarily illustrated in FIG. 14. Information required for calculating the characteristic values of the ellipse is included in the symmetric matrix $$\begin{pmatrix} A & C/2 \\ C/2 & B \end{pmatrix}$$

of equation (8). In particular, the eigenvalues of the symmetric matrix may equal the lengths a and b of the two half axes of the ellipse. In addition, the value arctan 2(.,.) of the vector components of one of the eigenvectors of the symmetric matrix may equal the rotation angle θ. The eigenvalues and eigenvectors of the symmetric matrix may be calculated in a further act.

The calculated eigenvalues a and b may be used to form a scaling mapping in two-dimensional space. The scaling mapping may be a linear mapping represented by a scaling matrix S according to:

$$S = \begin{pmatrix} 1/a & 0 \\ 0 & 1/b \end{pmatrix}. \tag{9}$$

In addition, the calculated rotation angle θ may be used to form a rotation mapping in two-dimensional space. The rotation mapping may be a linear mapping represented by a rotation matrix R according to:

$$R = \begin{pmatrix} \cos\theta & -\sin\theta \\ \sin\theta & \cos\theta \end{pmatrix}. \tag{10}$$

In a further act of the calibration process, the compensation matrix of equation (1) may be calculated by forming a matrix product S·R·M according to:

$$\begin{pmatrix} b_{00} & b_{01} & b_{02} \\ b_{10} & b_{11} & b_{12} \end{pmatrix} = \begin{pmatrix} 1/a & 0 \\ 0 & 1/b \end{pmatrix} \cdot \begin{pmatrix} \cos\theta & -\sin\theta \\ \sin\theta & \cos\theta \end{pmatrix} \cdot \begin{pmatrix} m_{00} & m_{01} & m_{02} \\ m_{10} & m_{11} & m_{12} \end{pmatrix}. \tag{11}$$

Inserting equation (11) into equation (1) may result in:

$$\begin{pmatrix} COS \\ SIN \end{pmatrix} = \begin{pmatrix} 1/a & 0 \\ 0 & 1/b \end{pmatrix} \cdot \begin{pmatrix} \cos\theta & -\sin\theta \\ \sin\theta & \cos\theta \end{pmatrix} \cdot \begin{pmatrix} m_{00} & m_{01} & m_{02} \\ m_{10} & m_{11} & m_{12} \end{pmatrix} \cdot \begin{pmatrix} B_x \\ B_y \\ B_z \end{pmatrix}. \tag{12}$$

The compensation mapping of equation (1) may thus include a transformation mapping M according to equation (5), a rotation mapping R according to equation (10) and a scaling mapping S according to equation (9). It is to be noted that for some cases not all of these individual mappings may be required for performing the compensation mapping of equation (1). For example, an ellipse may already be aligned with the coordinate axes after performing the transformation mapping such that no additional rotation of the ellipse may be required.

The compensation matrix of equation (11) may be calculated once during the described calibration process and may then be used for calculating the rotation angle of the magnet 2 according to equation (1) in real-time during an operation of the sensor device 4. At runtime, performing a compensation mapping according to equation (1) may require only little computational power. The calibration process merely requires three calibration points without the need for a reference angle. In addition, the calibration process does not require an entire 360 degrees rotation of the magnet 2 with respect to the sensor device 4.

The described concepts in accordance with the disclosure may outperform conventional concepts. In order to determine a rotation angle of a magnet or a component coupled thereto, conventional sensor devices may need to be arranged in plane with the magnet or in line with the rotation axis of the magnet. That is, using conventional approaches may result in stringent placement limitations of the magnet and the sensor device. In contrast to this, the position and the sensing direction of the sensor device relative to the magnet may be freely chosen when using an approach in accordance with the disclosure. The concepts described herein may be independent of a relative arrangement between the magnet and the magnetic field sensor measuring the 3D magnetic field vector. In contrast to conventional devices, the sensor devices in accordance with the disclosure may thus also be arranged out of plane with the magnet and/or out of line with a rotational axis of the magnet. It is understood that for performing a proper measurement, the magnetic field strength at the position of the magnetic field sensor may need to be sufficiently large.

FIGS. 4A to 4F schematically illustrate a method for determining a rotation angle of a magnet in accordance with the disclosure. The method of FIGS. 4A to 4F may be seen as a more detailed implementation of the method of FIG. 3. Comments made in connection with FIGS. 4A to 4F may thus also hold true for FIG. 3 and vice versa. In addition, the method of FIGS. 4A to 4F may be read in connection with FIG. 1 and the previously described mathematical concepts. FIGS. 4A to 4F are based on measured data.

Figure 4A:
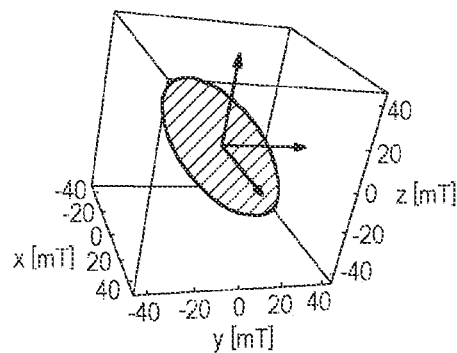
FIGS. 4A to 4F schematically illustrate a method for determining a rotation angle of a magnet in accordance with the disclosure.

FIG. 4A shows a three-dimensional coordinate system indicated by three coordinate axes x, y and z. The magnet 2 (see e.g. FIG. 1) may perform a rotational movement around the rotation axis 6. During such rotation, the 3D magnetic field vector of the magnetic field generated by the magnet 2 may describe at least a part of an ellipse in 3D space as shown in FIG. 4A. That is, the ellipse may correspond to a trajectory of the 3D magnetic field vector during a rotational movement of the magnet 2. When the magnet 2 is rotated by 360 degrees, the 3D magnetic field vector may run along the entire ellipse in the three-dimensional space. The sensor device 4 may measure 3D magnetic field vectors of corresponding magnetic fields generated by the magnet 2. Each measured 3D magnetic field vector may point to a point of the ellipse.

Figure 4B:
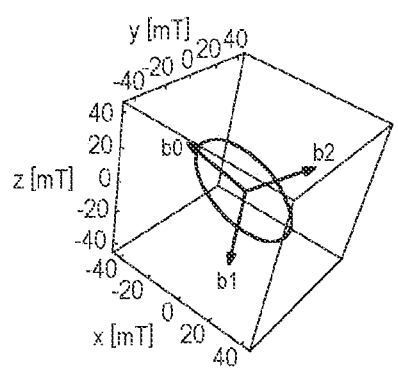

In FIG. 4B, a new set of orthonormal basis vectors b0, b1 and b2 may be determined. In one example, the vectors b0, b1 and b2 may be calculated according to equations (3a) to (3c) and equations (4a) to (4c). The ellipse shown in FIG. 4B may (still) correspond to the ellipse of FIG. 4A.

Figure 4C:
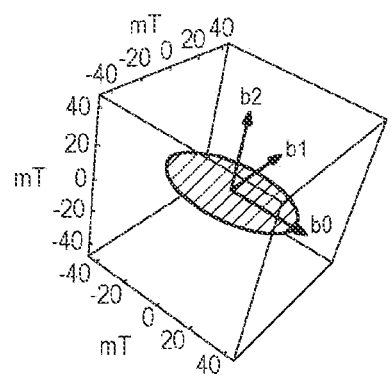

In FIG. 4C, a transformation mapping according to equation (5) may be applied in order to transform the ellipse in 3D space shown in FIG. 4B to an ellipse in 2D space shown in FIG. 4C. In addition, a rotation mapping according to equation (10) may be applied for aligning the two half axes of the ellipse in 2D space with the two axes of a 2D coordinate system indicated by vectors b0, b1 and b2.

Figure 4D:
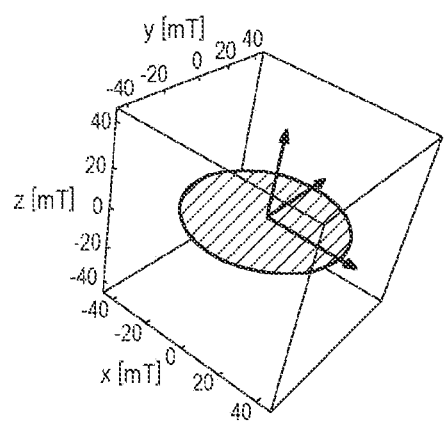

In FIG. 4D, a scaling mapping according to equation (9) may be applied in order to scale the ellipse in 2D space shown in FIG. 4C to a circle in 2D space shown in FIG. 4D.

By performing the acts of FIGS. 4A to 4C, the ellipse in 3D space of FIG. 4A may be transformed to the circle in 2D space of FIG. 4D. A combination of the performed acts may correspond to applying the compensation mapping according to equation (1). A movement of the 3D magnetic field vector along the ellipse in 3D space as shown in FIG. 4A may be compensated to a movement of a 2D vector along the circle in 2D space as shown in FIG. 4D. During the rotational movement of the magnet 2, the 2D vector may describe at least a part of the circle in 2D space. The acts of FIGS. 4A to 4C may be performed once in a calibration process. After the compensation matrix of equation (1) is determined, each 3D magnetic field vector measured by the sensor device 4 and corresponding to a point of the ellipse in FIG. 4A may be mapped to a point on the circle of FIG. 4D in real-time.

Figure 4E:
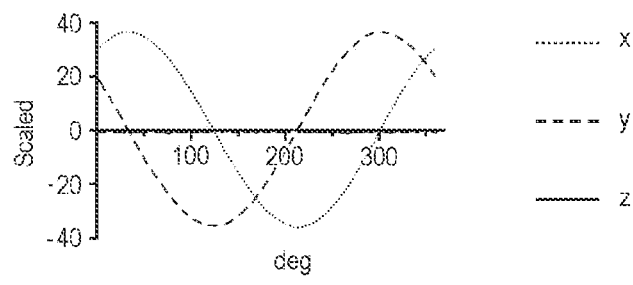

FIG. 4E illustrates components of the 2D vector describing the circle of FIG. 4D during a rotation of the magnet 2. The z-component equals zero. Each of the x- and y-component may have a sinusoidal waveform.

Figure 4F:
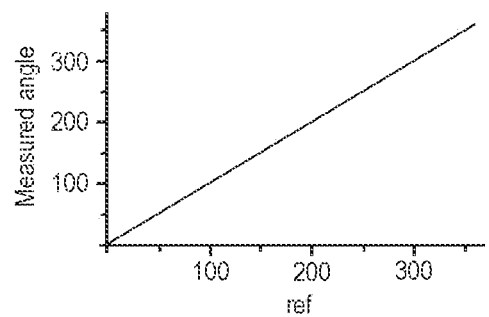

In FIG. 4F, the rotation angle of the magnet 2 may be calculated according to equation (2). FIG. 4F illustrates values of the measured (or calculated) rotation angle of the magnet 2 plotted against reference values of the rotation angle of the magnet 2. The measured values substantially equal the reference values for all rotation angles in the entire range from 0 degrees to 360 degrees. Accordingly, the method in accordance with the disclosure may provide an exact determination of the rotation angle of the magnet 2.

In the example of FIG. 4, the 3D magnetic field vector may describe an ellipse in 3D space during a rotational movement of the magnet. That is, the magnet may perform one or multiple full rotations. It is however to be noted that a rotation of the magnet is not restricted to full rotations. In further examples, the magnet may perform only partial rotations with arbitrary angle ranges. For example, a windshield wiper application may be based on partial rotations. In such cases, the 3D magnetic field vector may not describe a full ellipse, but only a part of an ellipse in 3D space.

Figure 5A:
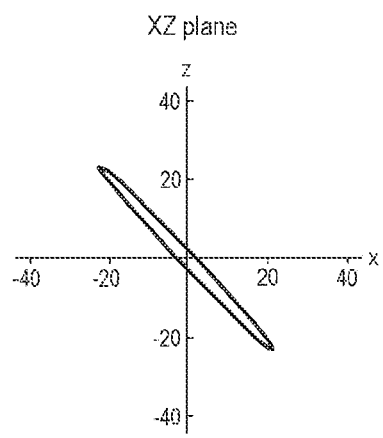
FIGS. 5A to 5C illustrate projections of an ellipse in 3D space into different coordinate planes.
Figure 5B:
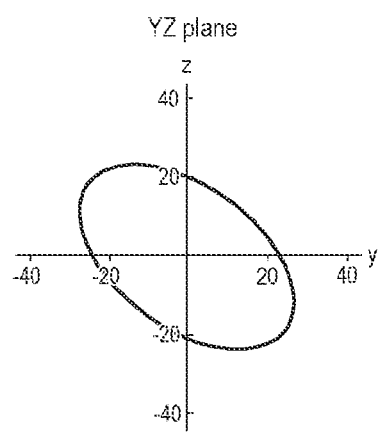
Figure 5C:
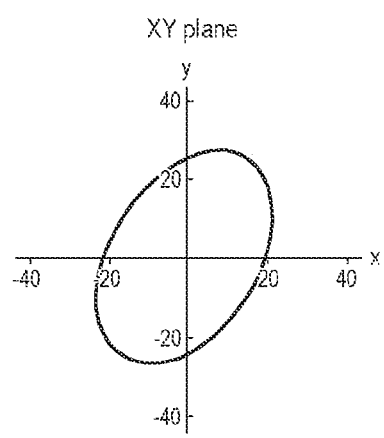

For illustrative purposes, FIGS. 5A to 5C illustrate projections of an ellipse in 3D space into different coordinate planes. In particular, the ellipse may correspond to the ellipse of FIG. 4A. FIG. 5A illustrates a projection of the ellipse into the x-z-plane, FIG. 5B illustrates a projection of the ellipse into the y-z-plane, and FIG. 5C illustrates a projection of the ellipse into the x-y-plane. Each projection of the 3D ellipse may result in a 2D ellipse in the respective projection plane.

Figure 6A:
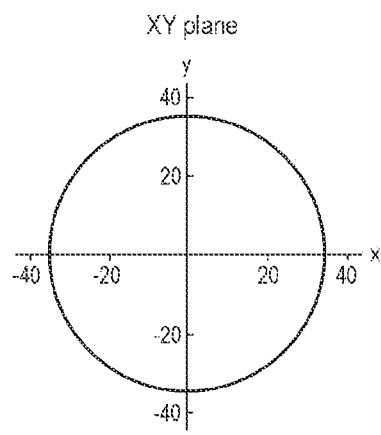
FIGS. 6A to 6C illustrate projections of a circle in 2D space into different coordinate planes.
Figure 6B:
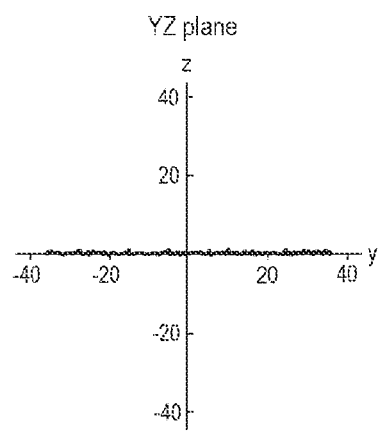
Figure 6C:
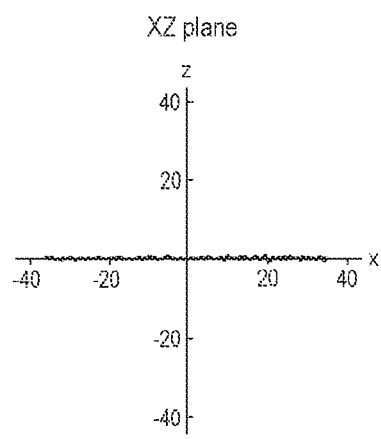

For illustrative purposes, FIGS. 6A to 6C illustrate projections of a circle in 2D space into different coordinate planes. In particular, the circle may correspond to the circle of FIG. 4D. FIG. 6A illustrates a projection of the circle into the x-z-plane, FIG. 6B illustrates a projection of the circle into the y-z-plane, and FIG. 6C illustrates a projection of the circle into the x-y-plane. FIGS. 6A to 6C show that the circle does not extend out of the x-y-plane. That is, when mapping the ellipse of FIG. 4A to the circle of FIG. 4D, all information of the 3D ellipse is compensated to information included in the 2D circle which is arranged in only one of the projection planes. In particular, such reduction from 3D to 2D may not result in any information loss.

Figure 7:
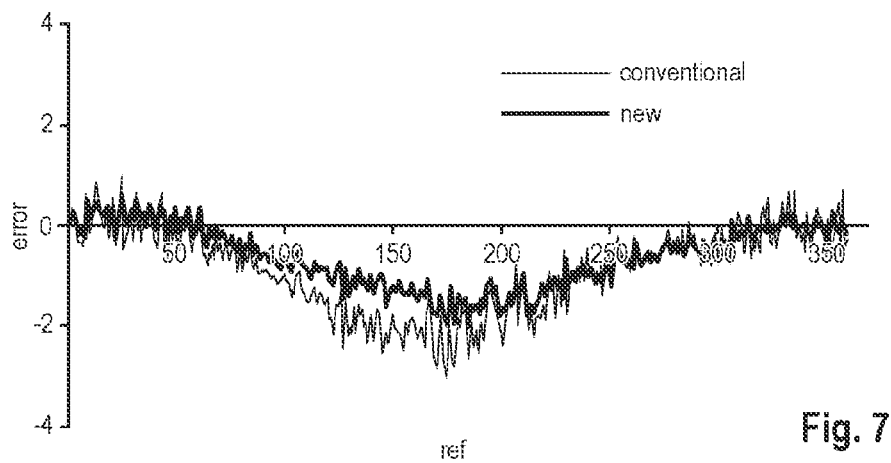
FIG. 7 illustrates error performances of methods for determining a rotation angle of a magnet.

FIG. 7 illustrates error performances of methods for determining a rotation angle of a magnet. The error of the measured rotation angle is plotted against the rotation angle. A thin solid line illustrates results obtained by a conventional method for determining the rotation angle based on data of FIG. 5B. A thick solid line illustrates results obtained by a method for determining the rotation angle in accordance with the disclosure based on data of FIG. 6A. FIG. 7 shows that the method in accordance with the disclosure provides a slightly improved error performance compared to the conventional method.

Figure 8:
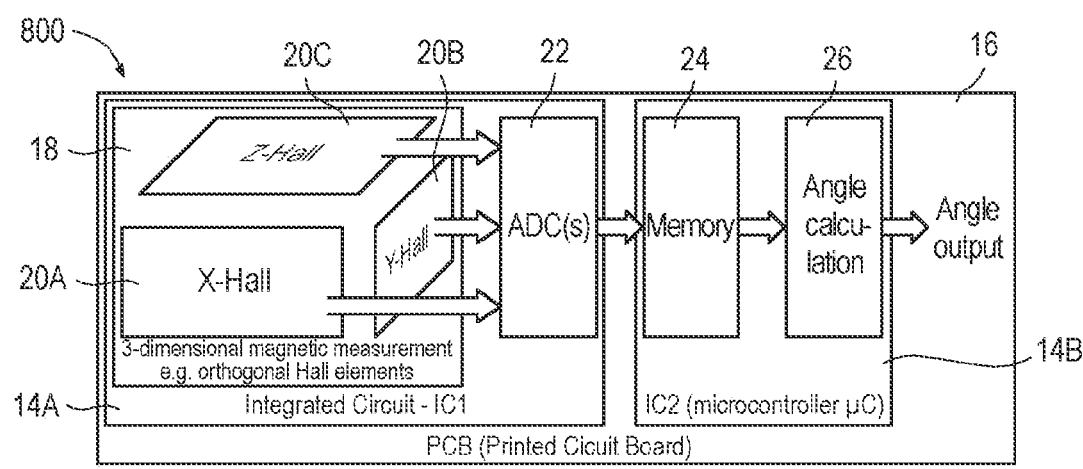
FIG. 8 schematically illustrates a sensor device 800 in accordance with the disclosure.

The sensor device 800 of FIG. 8 may be seen as a more detailed version of the sensor device 4 of FIG. 1. The sensor device 800 may include a first integrated circuit 14A and a second integrated circuit 14B. The integrated circuits 14A and 14B may be arranged on a printed circuit board 16. The first integrated circuit 14A may include a magnetic field sensor 18. In the example of FIG. 8, the magnetic field sensor 18 may be a 3D Hall sensor including three orthogonal Hall elements 20A, 20B and 20C configured to sense a magnetic field in the x-, y- and z-direction, respectively. The first integrated circuit 14A may further include an analog-to-digital converter 22. The second integrated circuit 14B may include a memory 24 and a calculation unit 26. In particular, the second integrated circuit 14B may correspond to or may include a microcontroller.

The magnetic field sensor 18 may be configured to provide a three-dimensional magnetic measurement of a magnetic field in which the sensor device 800 may be arranged. In addition, the magnetic field sensor 18 may be configured to output (in particular analog) measurement values to the analog-to-digital converter 22. The analog-to-digital converter 22 may be configured to convert the analog measurement values of the magnetic field sensor 18 to a digital signal. The memory 24 may be configured to store the digital signal. In addition, the digital signal may be provided to the calculation unit 26. The calculation unit 26 may be configured to determine the rotation angle of the magnet based on the concepts in accordance with the disclosure as previously described. For example, calculations for determining the rotation angle may be performed by software which may run on a processor or on the microcontroller. The calculated rotation angle may be output to a user or further components which are not illustrated for the sake of simplicity. It is noted that the sensor device 800 may not necessarily include all of the described components for an appropriate operation. Various components of the sensor device 800 may thus be seen as optional. For example, the magnet (not illustrated) or the memory 24 may be seen as a part of the sensor device 800 or not.

Figure 9:
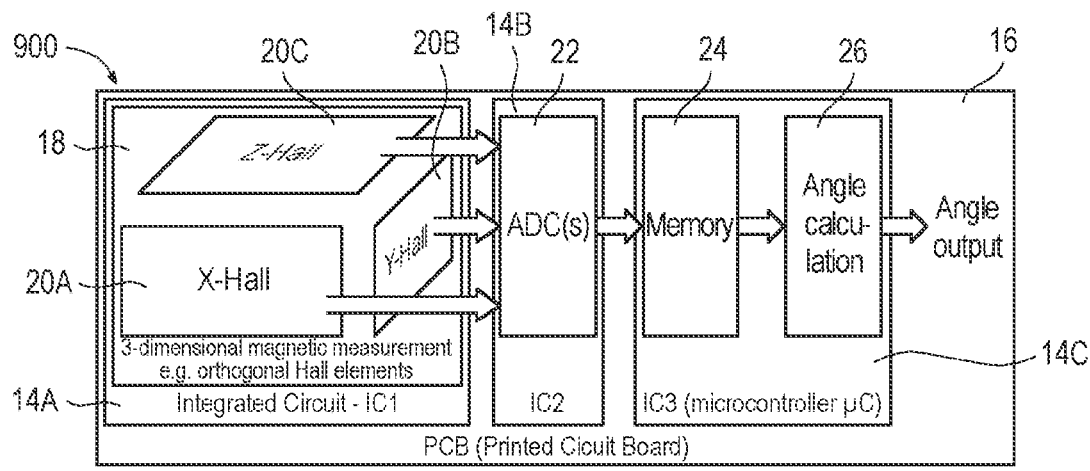
FIG. 9 schematically illustrates a sensor device 900 in accordance with the disclosure.

The sensor device 900 of FIG. 9 may be at least partly similar to the sensor device 800 of FIG. 8. In contrast to FIG. 8, the sensor device 900 may include three integrated circuits 14A, 14B and 14C. The first integrated circuit 14A may include the magnetic field sensor 18, the second integrated circuit 14B may include the analog-to-digital converter 22, and the third integrated circuit 14C may include the memory 24 and the calculation unit 26.

Figure 10:
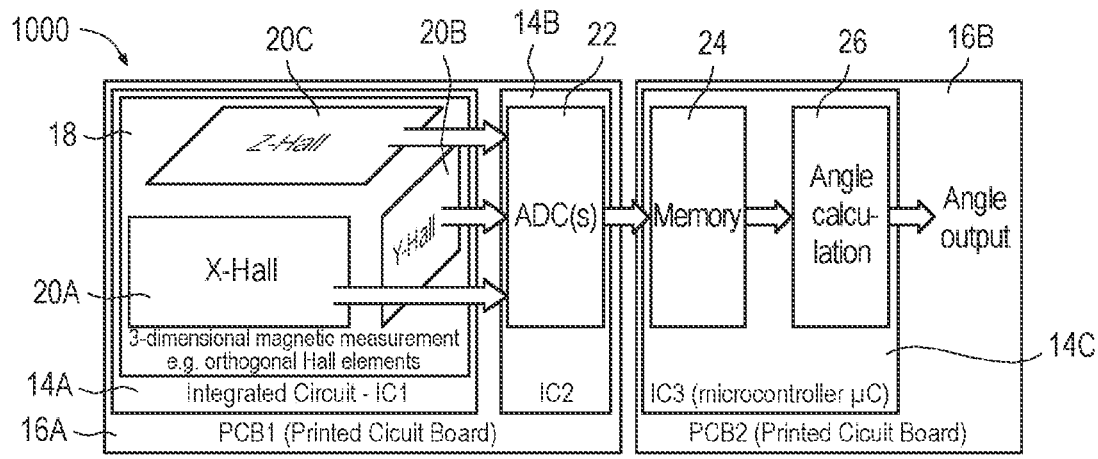
FIG. 10 schematically illustrates a sensor device 1000 in accordance with the disclosure.

The sensor device 1000 of FIG. 10 may be at least partly similar to the sensor device 900 of FIG. 9. In contrast to FIG. 9, the sensor device 1000 may include two printed circuit boards 16A and 16B. The first integrated circuit 14A and the second integrated circuit 14B may be arranged on the first printed circuit board 16A. In addition, the third integrated circuit 14C may be arranged on the second printed circuit board 16B.

Figure 11:
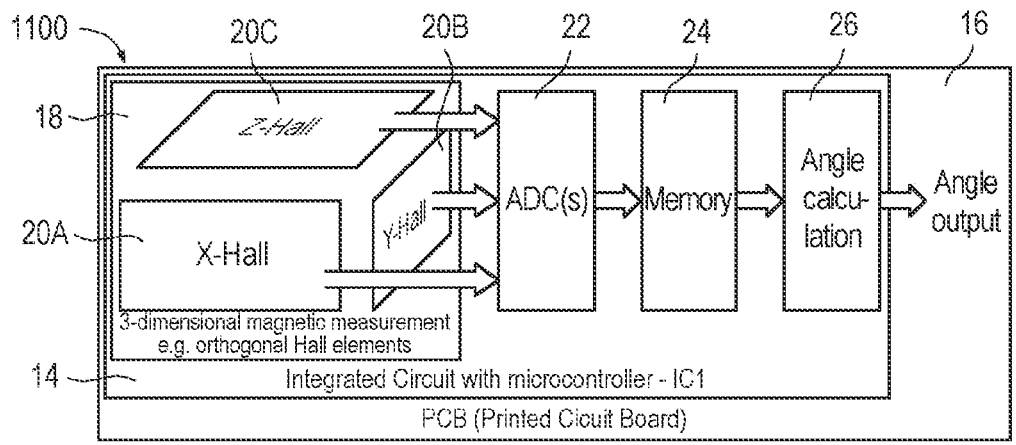
FIG. 11 schematically illustrates a sensor device 1100 in accordance with the disclosure.

The sensor device 1100 of FIG. 11 may be at least partly similar to the sensor device 800 of FIG. 8. In contrast to FIG. 8, all components of the sensor device 1100 may be integrated in a single integrated circuit 14 which may include a microcontroller.

Figure 12:
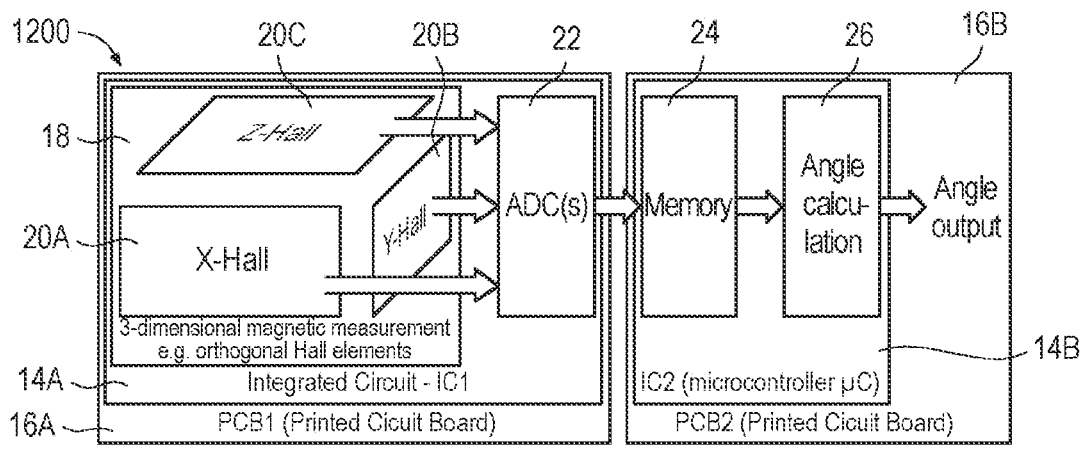
FIG. 12 schematically illustrates a sensor device 1200 in accordance with the disclosure.

The sensor device 1200 of FIG. 12 may be at least partly similar to the sensor device 1000 of FIG. 10. In contrast to FIG. 10, the magnetic field sensor 18 and the analog-to-digital converter 22 may be integrated in a similar integrated circuit 14A.

Figure 13:
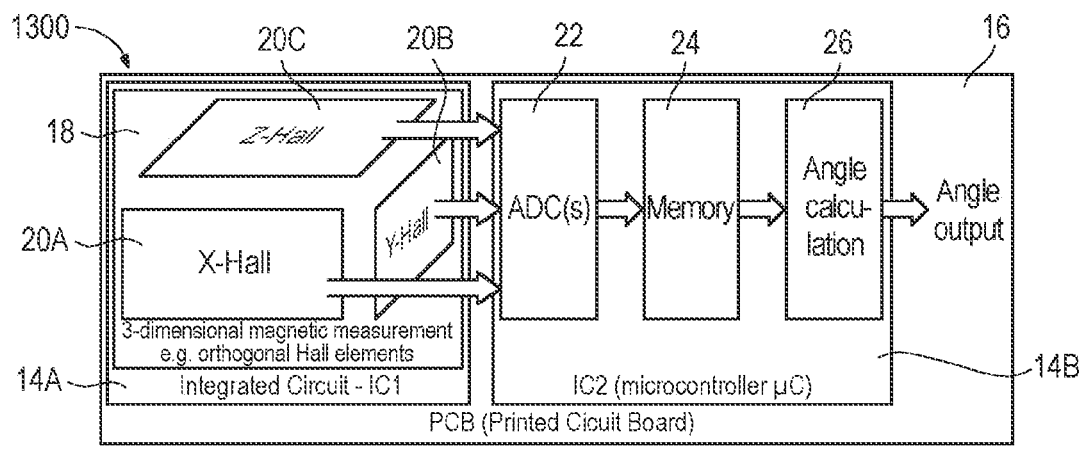
FIG. 13 schematically illustrates a sensor device 1300 in accordance with the disclosure.

The sensor device 1300 of FIG. 13 may be at least partly similar to the sensor device 800 of FIG. 8. In contrast to FIG. 8, the analog-to-digital converter 22 may be integrated in the second integrated circuit 14B.

Figure 15:
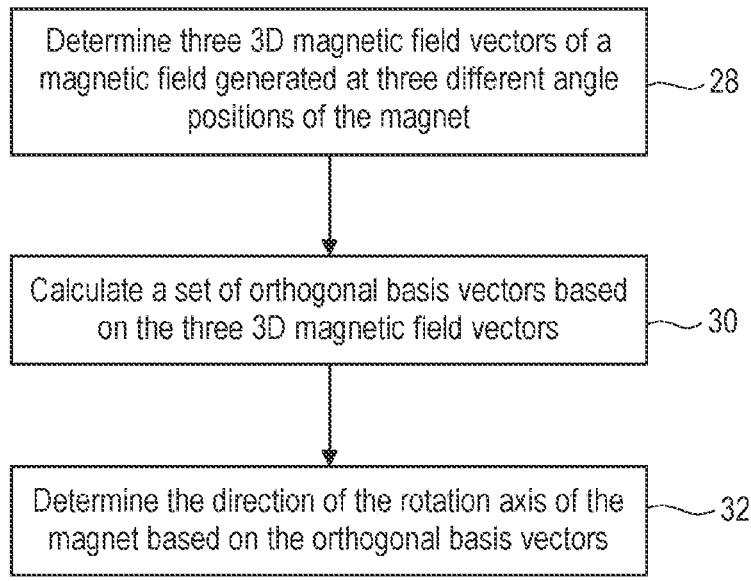
FIG. 15 illustrates a flowchart of a method in accordance with the disclosure.

FIG. 15 illustrates a flowchart of a method in accordance with the disclosure. The method of FIG. 15 may be considered as a part of the method of FIG. 3 or may be considered as an independent method.

At 28, three 3D magnetic field vectors of a magnetic field generated by a magnet may be determined at three different angle positions of the magnet. For example, a measurement of the three 3D magnetic field vectors may result in three measured 3D magnetic field vectors $\vec{p}_0$, $\vec{p}_1$ and $\vec{p}_2$ as described in connection with previous examples. At 30, a set of orthogonal basis vectors may be calculated based on the three 3D magnetic field vectors. For example, the calculation of act 30 may be based on equations (3a) to (3c). At 32, a direction of the rotation axis of the magnet may be determined based on the orthogonal basis vectors. In particular, the direction of the rotation axis may correspond to the basis vector $\vec{n}_2$ of equation (3c) or the normalized basis vector $\vec{m}_2$ of equation (4c). Each of the vectors $\vec{n}_2$ and $\vec{m}_2$ may correspond to a normal vector of an ellipse including the vectors $\vec{p}_0$, $\vec{p}_1$ and $\vec{p}_2$. The vector $\vec{m}_2$ may correspond to a rotation axis direction unit vector.

The method of FIG. 15 may include one or more further optional acts. In a further act, a spatial arrangement of the magnet may be determined based on the determined direction of the rotation axis. For example, one or multiple tilt angles of the magnet may be determined based on the determined rotation axis. In another act, a misalignment of the sensor device and/or the magnet may be detected based on the determined direction of the rotation axis. For example, the determined direction of the rotation axis may be compared to a predetermined direction which may be associated with a correct alignment of the sensor device and/or the magnet. If the determined direction differs from the predetermined direction, the sensor device and/or the magnet may be regarded as misaligned. Information about the misalignment may be output to a user performing a setup of the arrangement. The misalignment may be corrected in a further act.

Figure 16A:
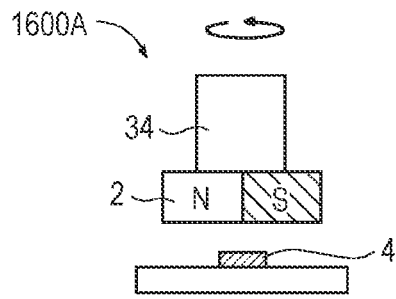
FIGS. 16A to 16C illustrate arrangements 1600A to 1600C including a magnet and a sensor device in accordance with the disclosure.
Figure 16B:
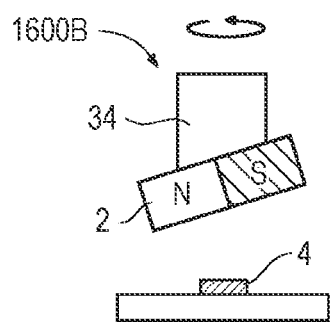
Figure 16C:
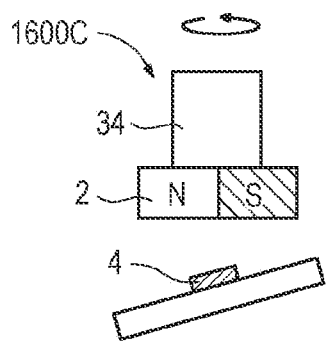

FIG. 16A illustrates an arrangement 1600A including a magnet 2 and sensor device 4 in accordance with the disclosure. The magnet 2 may be mechanically coupled to a shaft 34 and may perform a rotational movement indicated by an arrow. The magnet 2 and the sensor device 4 may be aligned in an appropriate manner. The arrangements 1600B and 1600C of FIGS. 16B and 16C may be similar to the arrangement 1600A of FIG. 16A. In the example of FIG. 16B, the magnet 2 may be tilted and may thus be misaligned relative to the sensor device 4. In the example of FIG. 16C, the sensor device 4 may be tilted and may thus be misaligned relative to the magnet 2. In both cases, the misalignment between the magnet 2 and the sensor device 4 may result in undesired measurement errors. The misalignment of the magnet 2 and/or the sensor device 4 may be detected based on the direction of the rotation axis determined according to the method of FIG. 15. The arrangement between the magnet 2 and the sensor device 4 may be corrected based on the determined misalignment.

Figure 17:
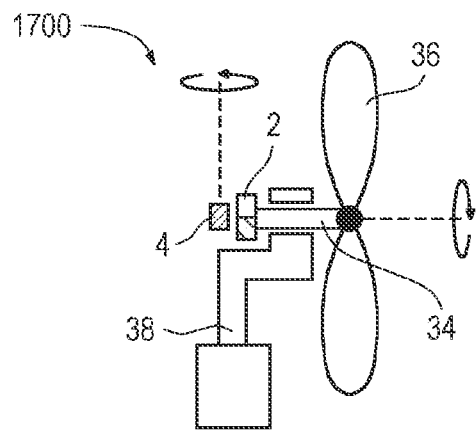
FIG. 17 illustrates an application 1700 including a sensor device in accordance with the disclosure.

FIG. 17 illustrates an application (or arrangement) 1700 including a sensor device in accordance with the disclosure. The application is exemplary and by no means limiting. Further applications including sensor devices in accordance with the disclosure are specified above.

The application 1700 may be a wind meter including a magnet 2 and a wind wheel 36 interconnected by a shaft 34. The magnet 2 and the wind wheel 36 may be configured to perform a rotational movement around a rotational axis. The shaft 34 may be mounted on a rack 38. The application 1700 may further include a sensor device 4 in accordance with the disclosure. The sensor device 4 may be configured to determine a rotation angle of the magnet 2 and the wind wheel 36 as previously described. In addition, the sensor device 4 may be configured to detect a misalignment of the magnet 2 and/or the sensor device 4 as previously described.

EXAMPLES

In the following, methods and sensor devices in accordance with the disclosure are explained by means of examples.

Example 1 is a method for determining a rotation angle of a magnet, the method comprising: measuring a 3D magnetic field vector of a magnetic field generated by the magnet, wherein the 3D magnetic field vector describes at least a part of an ellipse in 3D space during a rotational movement of the magnet; mapping the measured 3D magnetic field vector to a 2D vector based on a compensation mapping, wherein the compensation mapping is configured to map the ellipse in 3D space to a circle in 2D space; and determining the rotation angle of the magnet based on the 2D vector.

Example 2 is a method according to Example 1, wherein the 2D vector describes at least a part of the circle in 2D space during the rotational movement of the magnet.

Example 3 is a method according to Example 1 or 2, wherein determining the rotation angle based on the 2D vector comprises calculating an arctangent function based on the two vector components of the 2D vector.

Example 4 is a method according to one of the preceding Examples, wherein the compensation mapping comprises a transformation mapping configured to transform the ellipse in 3D space to an ellipse in 2D space.

Example 5 is a method according to Example 4, wherein the compensation mapping comprises a rotation mapping configured to rotate the ellipse in 2D space, wherein the two half axes of the ellipse in 2D space are aligned with the two axes of a 2D coordinate system.

Example 6 is a method according to Example 4 or 5, wherein the compensation mapping comprises a scaling mapping configured to scale the ellipse in 2D space to a circle in 2D space.

Example 7 is a method according to one or more of the preceding Examples, wherein at least one of the compensation mapping, the transformation mapping, the rotation mapping or the scaling mapping is a linear mapping represented by a matrix.

Example 8 is a method according to Example 5 and Example 6, wherein the compensation mapping is represented by a matrix product S·R·M, wherein S is a scaling matrix representing the scaling mapping, R is a rotation matrix representing the rotation mapping, and M is a transformation matrix representing the transformation mapping.

Example 9 is a method according to one of the preceding Examples, wherein the acts of mapping the 3D magnetic field vector to the 2D vector and determining the rotation angle based on the 2D vector are performed in real-time.

Example 10 is a method according to one of the preceding Examples, further comprising: determining the compensation mapping by performing a calibration process.

Example 11 is a method according to Example 10, wherein the calibration process comprises: determining three 3D magnetic field vectors of the magnetic field generated by the magnet at three different angle positions of the magnet; and determining the compensation mapping based on the three 3D magnetic field vectors.

Example 12 is a method according to Example 11, wherein angle positions of adjacent ones of the three 3D magnetic field vectors differ by at least 90 degrees.

Example 13 is a method according to Example 4 and one of Examples 11 and 12, wherein the calibration process comprises: calculating a set of orthogonal basis vectors based on the three 3D magnetic field vectors; and forming a transformation matrix representing the transformation mapping based on two of the three 3D magnetic field vectors.

Example 14 is a method according to Example 13, wherein the calibration process comprises: transforming the three 3D magnetic field vectors to three 2D vectors based on the transformation matrix; determining an equation system by inserting the three 2D vectors into an ellipse equation; and determining three coefficients by solving the equation system.

Example 15 is a method according to Example 6 and Example 14, wherein the calibration process comprises: forming a symmetric matrix representing the ellipse equation based on the three coefficients; calculating eigenvalues of the symmetric matrix; and forming a scaling matrix representing the scaling mapping based on the calculated eigenvalues.

Example 16 is a method according to Example 5 and Example 15, further comprising: calculating an eigenvector of the symmetric matrix; calculating a rotation angle based on vector components of the calculated eigenvector; and forming a rotation matrix representing the rotation mapping based on the calculated rotation angle.

Example 17 is a method according to one of the preceding Examples, further comprising: determining a rotation angle of a component coupled to the magnet, wherein the rotation of the component is based on the rotation of the magnet.

Example 18 is a method according to Example 17, wherein the component comprises at least one of an automotive component, a steering wheel, a valve, a windshield wiper, a rotary knob, a component of an engine, a component of a clutch, a shaft, a wind meter.

Example 19 is a method according to one of the preceding Examples, further comprising: determining a spatial arrangement of the magnet based on the compensation mapping.

Example 20 is a sensor device, comprising: a magnetic field sensor configured to measure a 3D magnetic field vector of a magnetic field generated by a magnet, wherein the 3D magnetic field vector describes at least a part of an ellipse in 3D space during a rotational movement of the magnet; and a calculation unit configured to: map the determined 3D magnetic field vector to a 2D vector based on a compensation mapping, wherein the compensation mapping is configured to map the ellipse in 3D space to a circle in 2D space; and determine the rotation angle of the magnet based on the 2D vector.

Example 21 is a sensor device according to Example 20, wherein the magnet is diametrically magnetized.

Example 22 is a sensor device according to Example 20 or 21, wherein the magnetic field sensor is arranged out of plane with the magnet and out of line with a rotational axis of the magnet.

Example 23 is a sensor device according to one of Examples 20 to 22, wherein the magnetic field sensor is included in an integrated circuit and the calculation unit is included in a microcontroller.

Example 24 is a sensor device according to one of Examples 20 to 23, further comprising: an analog-to-digital converter configured to convert an analog output signal of the magnetic field sensor to a digital signal, and a memory configured to store the digital signal.

Example 25 is a sensor device according to Example 23 and Example 24, wherein the analog-to-digital converter is included in the integrated circuit and the memory is included in the microcontroller.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference of the description. It is therefore intended that the appended claims encompass any such modifications or embodiments.

What is claimed is:

1. A method for determining a rotation angle of a magnet, the method comprising:
    measuring, by a sensor device associated with the magnet, a 3D magnetic field vector of a magnetic field generated by the magnet, wherein the 3D magnetic field vector describes at least a part of an ellipse in 3D space during a rotational movement of the magnet;
    mapping the measured 3D magnetic field vector to a 2D vector based on a compensation mapping,
        wherein the compensation mapping is configured to map the ellipse in 3D space to a circle in 2D space, and
        wherein the compensation mapping is based on a linear mapping represented by a compensation matrix; and
    determining a rotation angle of the magnet based on the 2D vector.

2. The method of claim 1, wherein the 2D vector describes at least a part of the circle in 2D space during the rotational movement of the magnet.

3. The method of claim 1, wherein determining the rotation angle based on the 2D vector comprises calculating an arctangent function based on two vector components of the 2D vector.

4. The method of claim 1, wherein the compensation mapping comprises a transformation mapping configured to transform the ellipse in 3D space to an ellipse in 2D space based on another linear mapping represented by a transformation matrix.

5. The method of claim 4, wherein the compensation mapping comprises a rotation mapping configured to rotate the ellipse in 2D space, wherein two half axes of the ellipse in 2D space are aligned with two axes of a 2D coordinate system.

6. The method of claim 4, wherein the compensation mapping comprises a scaling mapping configured to scale the ellipse in 2D space to a circle in 2D space.

7. The method of claim 1, wherein the compensation mapping is a linear mapping represented by a matrix.

8. The method of claim 5, wherein:
    the compensation mapping comprises a scaling mapping configured to scale the ellipse in 2D space to a circle in 2D space, and
    the compensation mapping is represented by a matrix product S·R·M, wherein S is a scaling matrix representing the scaling mapping, R is a rotation matrix representing the rotation mapping, and M is a transformation matrix representing the transformation mapping.

9. The method of claim 1, wherein mapping the 3D magnetic field vector to the 2D vector and determining the rotation angle based on the 2D vector are performed in real-time.

10. The method of claim 1, further comprising:
    determining the compensation mapping by performing a calibration process.

11. The method of claim 10, wherein the calibration process comprises:
    determining three 3D magnetic field vectors of the magnetic field generated by the magnet at three different angle positions of the magnet; and
    determining the compensation mapping based on the three 3D magnetic field vectors.

12. The method of claim 11, wherein angle positions of adjacent ones of the three 3D magnetic field vectors differ by at least 90 degrees.

13. The method of claim 11, wherein the compensation mapping comprises a transformation mapping configured to transform the ellipse in 3D space to an ellipse in 2D space, and
    wherein the calibration process comprises:
    calculating a set of orthogonal basis vectors based on the three 3D magnetic field vectors; and
    forming a transformation matrix representing the transformation mapping based on two of the three 3D magnetic field vectors.

14. The method of claim 13, wherein the calibration process comprises:
    transforming the three 3D magnetic field vectors to three 2D vectors based on the transformation matrix;
    determining an equation system by inserting the three 2D vectors into an ellipse equation; and
    determining three coefficients by solving the equation system.

15. The method of claim 14, wherein the compensation mapping comprises a scaling mapping configured to scale the ellipse in 2D space to a circle in 2D space, and
    wherein the calibration process comprises:
    forming a symmetric matrix representing the ellipse equation based on the three coefficients;
    calculating eigenvalues of the symmetric matrix; and
    forming a scaling matrix representing the scaling mapping based on the calculated eigenvalues.

16. The method of claim 15, wherein the compensation mapping comprises a scaling mapping configured to scale the ellipse in 2D space to a circle in 2D space,
    wherein the compensation mapping comprises a rotation mapping configured to rotate the ellipse in 2D space, wherein two half axes of the ellipse in 2D space are aligned with two axes of a 2D coordinate system, and wherein the method further comprises:
calculating an eigenvector of the symmetric matrix;
calculating a rotation angle based on vector components of the calculated eigenvector; and
forming a rotation matrix representing the rotation mapping based on the calculated rotation angle.

17. The method of claim 1, further comprising:
determining a rotation angle of a component coupled to the magnet, wherein a rotation of the component is based on a rotation of the magnet.

18. The method of claim 17, wherein the component comprises at least one of an automotive component, a steering wheel, a valve, a windshield wiper, a rotary knob, a component of an engine, a component of a clutch, a shaft, a wind meter.

19. The method of claim 1, further comprising:
determining a spatial arrangement of the magnet based on the compensation mapping.

20. A sensor device, comprising:
a magnetic field sensor configured to measure a 3D magnetic field vector of a magnetic field generated by a magnet,
wherein the 3D magnetic field vector describes at least a part of an ellipse in 3D space during a rotational movement of the magnet; and
at least one processor configured to:
map the measured 3D magnetic field vector to a 2D vector based on a compensation mapping, wherein the compensation mapping is configured to map the ellipse in 3D space to a circle in 2D space,
wherein the compensation mapping is based on a linear mapping represented by a compensation matrix; and
determine a rotation angle of the magnet based on the 2D vector.

21. The sensor device of claim 20, wherein the magnet is diametrically magnetized.

22. The sensor device of claim 20, wherein the magnetic field sensor is arranged out of plane with the magnet and out of line with a rotational axis of the magnet.

23. The sensor device of claim 20, wherein the magnetic field sensor is included in an integrated circuit and the at least one processor is included in a microcontroller.

24. The sensor device of claim 20, further comprising:
an analog-to-digital converter configured to convert an analog output signal of the magnetic field sensor to a digital signal; and
a memory configured to store the digital signal.

25. The sensor device of claim 24, wherein the magnetic field sensor is included in an integrated circuit, the at least one processor is included in a microcontroller, the analog-to-digital converter is included in the integrated circuit and the memory is included in the microcontroller.

* * * * *